United States Patent
Hasan et al.

(10) Patent No.: US 10,057,353 B2
(45) Date of Patent: Aug. 21, 2018

(54) REDUNDANT AND SELECTABLE GATEWAY AND CONTROL ELEMENTS FOR REMOTE CONNECTED THERMOSTATS

(71) Applicant: EnTouch Controls, Inc., Richardson, TX (US)

(72) Inventors: Iftekhar Hasan, Richardson, TX (US); Gregory H. Fasullo, Dallas, TX (US); Tejasbhai D. Patel, Plano, TX (US)

(73) Assignee: Entouch Controls, Inc., Richardson, TX (US)

( * ) Notice: Subject to any disclaimer, the term of this patent is extended or adjusted under 35 U.S.C. 154(b) by 195 days.

(21) Appl. No.: 15/076,196

(22) Filed: Mar. 21, 2016

(65) Prior Publication Data
US 2016/0205196 A1    Jul. 14, 2016

Related U.S. Application Data

(63) Continuation of application No. 13/768,865, filed on Feb. 15, 2013, now Pat. No. 9,291,357.

(51) Int. Cl.
| | |
|---|---|
| *G06F 19/00* | (2018.01) |
| *H04L 29/08* | (2006.01) |
| *F24F 11/00* | (2018.01) |
| *G05D 23/19* | (2006.01) |
| *H04L 12/28* | (2006.01) |
| *H04W 4/38* | (2018.01) |

(52) U.S. Cl.
CPC .......... *H04L 67/125* (2013.01); *F24F 11/00* (2013.01); *G05D 23/1932* (2013.01); *G05D 23/1934* (2013.01); *H04L 12/283* (2013.01); *H04L 67/10* (2013.01); *H04W 4/38* (2018.02); *H04L 2012/2841* (2013.01)

(58) Field of Classification Search
CPC ..... H04L 67/125; H04L 67/10; H04L 12/283; H04L 2012/2841; H04W 4/00; G05D 23/1932; G05D 23/1934; F24F 11/00
See application file for complete search history.

(56) References Cited

U.S. PATENT DOCUMENTS

| | | |
|---|---|---|
| 4,736,393 A | 4/1988 | Grimes et al. |
| 4,843,084 A * | 6/1989 | Parker ................ G05D 23/1917 165/205 |
| 4,931,948 A | 6/1990 | Parker et al. |
| 5,181,653 A | 1/1993 | Foster et al. |
| 5,495,887 A | 3/1996 | Kathnelson et al. |

(Continued)

*Primary Examiner* — Michael D Masinick
(74) *Attorney, Agent, or Firm* — Frost Brown Todd, LLC

(57) ABSTRACT

A networking thermostat is described that includes a main processor and a communications processor. The main processor includes a network manager function, a master messaging function and a slave messaging function while the communications processor includes a wireless radio enabling the thermostat to communicate with other networking thermostats. The networking thermostat is able to operate in a master mode or a slave mode, where the master mode allows the networking thermostat to act as a main gateway between other networking thermostats and a remote server. When in the master mode the networking thermostat can default to a slave if communication with the remote server is lost, thereby allowing one of the other networking thermostats to become a master.

13 Claims, 8 Drawing Sheets

(56) References Cited

U.S. PATENT DOCUMENTS

| | | |
|---|---|---|
| 5,810,245 A | 9/1998 | Heitman et al. |
| 7,668,923 B2 | 2/2010 | Herring et al. |
| 8,038,075 B1 | 10/2011 | Walsh |
| 2005/0129037 A1* | 6/2005 | Zumsteg ................ H04L 12/28 370/404 |
| 2007/0012052 A1* | 1/2007 | Butler .................. F24F 11/0009 62/181 |
| 2007/0040657 A1 | 2/2007 | Fosler et al. |
| 2008/0170511 A1 | 7/2008 | Shorty et al. |
| 2008/0244307 A1* | 10/2008 | Dasari ................. G06F 11/1482 714/4.12 |
| 2009/0149123 A1 | 6/2009 | Blagg |
| 2010/0165916 A1 | 7/2010 | Duan et al. |
| 2013/0338839 A1 | 12/2013 | Rogers et al. |

* cited by examiner

REDUNDANT AND SELECTABLE GATEWAY AND CONTROL ELEMENTS FOR REMOTE CONNECTED THERMOSTATS

CROSS REFERENCE TO RELATED INFORMATION

This application is a continuation application of U.S. patent application Ser. No. 13/768,865, now U.S. Pat. No. 9,291,357, filed Feb. 15, 2013, the contents of which are hereby incorporated herein in its entirety.

TECHNICAL FIELD

The present disclosure is directed to thermostats, and more particularly to networked thermostats which can form learning networks.

BACKGROUND OF THE INVENTION

Traditionally, thermostats are stand alone devices that monitor the temperature in a given area of a house or office building and work to maintain the surrounding air temperature at a set point. The thermostats would be connected to the controllers of the heating and air conditioning units but would otherwise be disconnected from other thermostats and equipment. Given the ubiquity of networks, both wire line and wireless, in modern buildings, there have been moves to connect thermostats into existing network infrastructures, in large part to allow them to be controlled from a remote location.

There are several thermostats in the present market which can be connected to a remote server via an end user's wireless or wire line access point. This scheme is suitable for smaller residential application where each thermostat maintains its own connection to the remote server without forming any network within the building. The other option available to the users is to use an additional gateway device, which collects and aggregates data from the thermostats (and other devices supported by the gateways). In such system, in addition to this extra gateway equipment, the system does not provide any redundant means of maintaining the external communication, in the event the dedicated gateway fails. What is needed is a networking thermostat that does not require separate gateway equipment.

BRIEF SUMMARY OF THE INVENTION

In a preferred embodiment, a networking thermostat is described that includes a main processor and a communications processor. The main processor includes a network manager function, a master messaging function and a slave messaging function while the communications processor includes a wireless radio enabling the thermostat to communicate with other networking thermostats. The networking thermostat is able to operate in a master mode or a slave mode, where the master mode allows the networking thermostat to act as a main gateway between other networking thermostats and a remote server. When in the master mode, the networking thermostat can default to a slave if communication with the remote server is lost, thereby allowing one of the other networking thermostats to become a master.

In another preferred embodiment, a method of operating a group of networking thermostats is described. The method begins by designating one networking thermostat from the group of networking thermostats as a master. Next, another of the networking thermostats is designated as a standby master, where the standby master and the remainder of the networking thermostats operate as slaves. A network is then formed where the remainder of networking thermostats operating as slaves form a star network with the networking thermostat designated as the master. The network can then collect data from the slaves at the master and pass the data to a remote server. If communication is lost between the master and the remote server, the network can default to the standby master so that a network where the remainder of the networking thermostats operating as slaves form a star network with the networking thermostat designated as the standby master.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The present invention offers the advantage of forming an in-building network of thermostats, energy monitoring, and load (e.g. light) control devices, where any of the thermostats can be configured to become a gateway by the user or an automated signal from a remote server. The user configuration of this thermostat allows the end users to procure and deploy only one type of device. The user can select their mode of operation as a "slave" (data reporting/control node) or a master (data gathering/gateway node) to manage the remote connection. The automated process of switching a thermostat's mode of operation from a slave to a gateway allows a switch over from one main gate way to a redundant gateway, in the event of a failure of the first. This allows a failsafe redundant remote connectivity of the system without a need for any special equipment.

Figure 1:
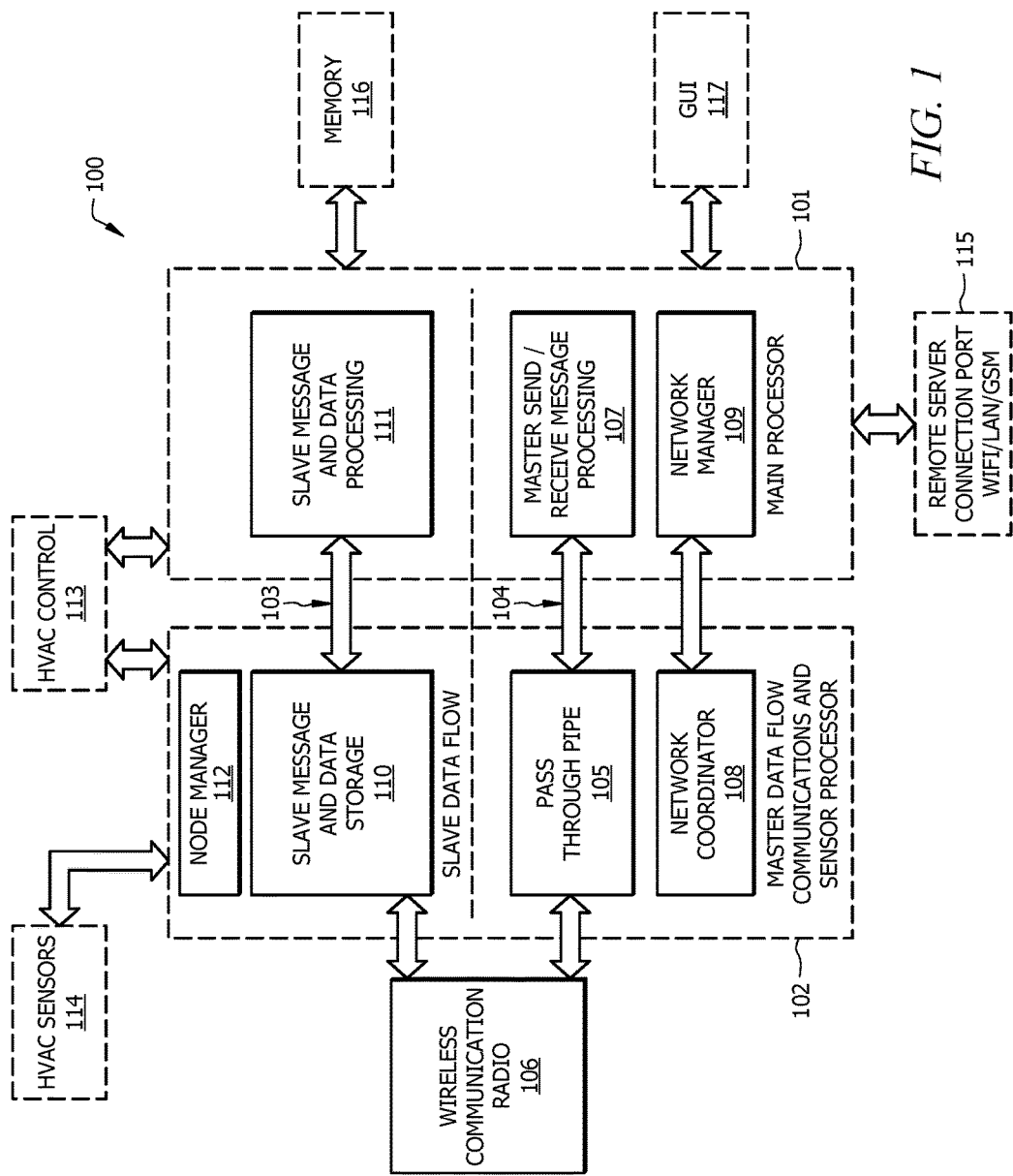
FIG. 1 is a block diagram of a preferred embodiment of a networked thermostat according to the concepts described herein.

Referring now to FIG. 1, a thermostat 100 according to the concept described herein is shown. Thermostat 100 includes main microcontroller 101, which is operable to execute the programming of thermostat 100. Main microcontroller 101 may include on board memory to store configuration and programming information or may use some portion of memory 116. Main microcontroller 101 controls the display and graphical user interface 117, through which users may directly interact with the controller to view current status or to change the programming or configuration information. Main microcontroller 101 also controls the remote access port 115, which provides for communications with external networks such as WiFi, LAN, or GSM networks.

Communication and sensor microcontroller 102 is also in communication with main microcontroller 101 and provides the interface between the main microcontroller 101 and any remote HVAC sensors 114. Communication and sensor microcontroller 102 also interfaces with the wireless radio 106 that communicates with other thermostats and energy meters in the distribution or breaker panel. Communication and sensor microcontroller 102 and main microcontroller 101 also interface with the HVAC controller 113, which is used to control the HVAC system hardware.

Thermostat 100 utilizes the two microcontrollers 101 and 102 to implement the needed communication system between the linked thermostats. The present invention implements two possible parallel paths of data flow and management, namely master data flow 104 and slave data flow 103, to make it possible for the same thermostat to work as a "Master Thermostat", capable of gathering the total system information or as a "Slave" providing the information to the "Master Thermostat".

Figure 2:
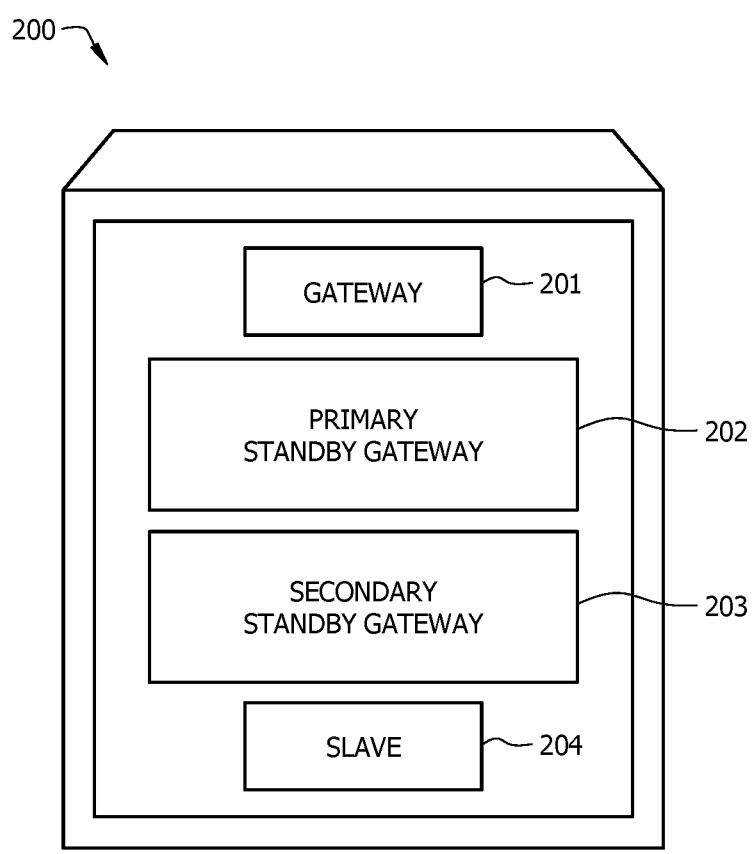
FIG. 2 is a screen shot of a preferred embodiment of an interface with the networked thermostat of FIG. 1.

Main processor 101 performs multiple functions, including sending and receiving data from and to the user interface. An embodiment of a user interface for selecting the mode of the thermostat is shown in FIG. 2. Interface 200 allows the user interface to configure the controller as the "Gateway" using selection 201, "Primary Standby Gateway" using selection 202, or "Secondary Standby Gateway" using selection 203. The "Slave" selection 204 is the default selection should none of the other modes be chosen. The second, or communications processor 102 in thermostat 100 is mainly responsible for the management of the communication between the master and the slave(s).

If the unit is selected to operate in the Gateway (Master) mode the data and control flow follows the blocks and paths shown along master flow path 104. The master always initiates a communication with a slave by sending or requesting some information. In this case, the communication processor, using pass through pipe 105, acts like a transparent pipe and passes the information from master message processing system 107 in main processor 101 to the targeted slave through the wireless radio device 106. In addition to that the communication processor 102 and main processor 101 keep a record of overall network information using network coordinator 108 and network manager 109, respectively. The network information includes items such as MAC addresses of all connected and available "Slave" devices and other network configuration information.

If the user interface selects controller to be the slave or standby gateway (primary or secondary), the blocks and data flow path shown along slave flow path 103 is selected. In this mode the unit only communicates with the master when requested by the master. In order to achieve a quick response to an incoming communication from the master, the received message is stored in the slave message data storage 110 of communication processor 102 and a requested response is also sent from information stored in data storage 110 from the same processor. In addition to that, the communication processor maintains some of its own network related information using node manager 112. The main processor 111 asynchronously communicates with the communication processor 110 to fetch the incoming messages from the master and refresh the data to be sent to the master by the communication processor.

Figure 3:
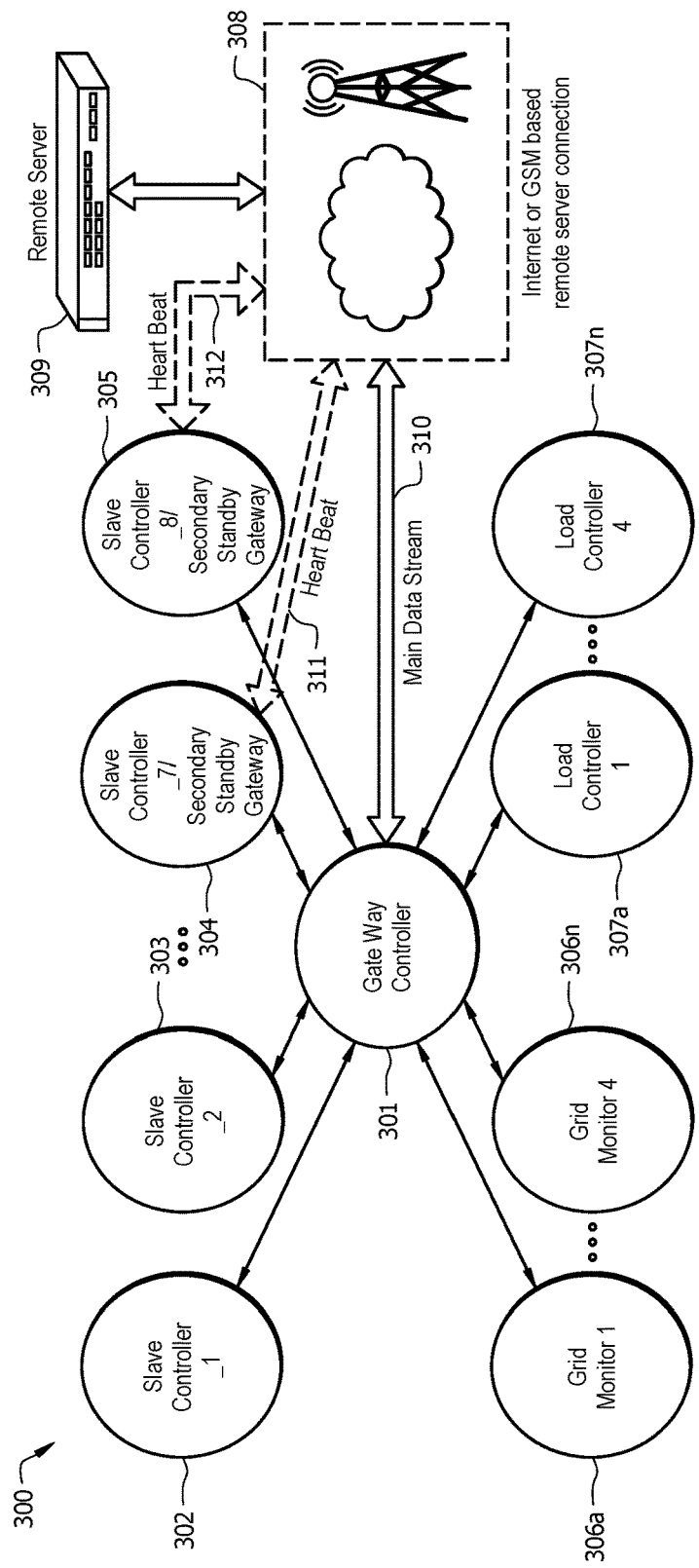
FIG. 3 is a system diagram of a preferred embodiment of a redundant network according to the concepts described herein.

Referring now to FIG. 3, an embodiment of a network topology 300 using the concepts described herein is shown. The present invention utilizes a star network topology, where a unit designated as "Master Thermostat", shown as gateway controller 301, maintains communication with all other devices ("Slave Units") in the network for information exchange and control. The slave units can be other thermostats 302, 303 through 304, 305, energy monitoring devices 306a through 306n, or load control units 307a through 307n. As described above, the present invention utilizes an approach where any thermostat can be configured as a master or slave unit. In addition to forming the internal network of the devices, the master thermostat 301 by default works as the main gateway. The function of the gateway controller 301 is to maintain a continuous and reliable data communication to a remote server 309. Access to this remote server is provided over any suitable network connection 308 including internet, cellular network, or other communications network. In preferred embodiments, access to the remote server 309 is used for the functionality of the system as it enables a mechanism for regular data collection, access, and control. The present invention allows additional slave thermostats to be designated as primary standby gateway 305 and secondary standby gateway 304. In this way, these thermostats designated as standby gateways 304 and 305 are available to function as a resource for remote connectivity, in the event of a communication failure between the main gateway 301 and remote server 309.

Embodiments of network systems utilizing the concepts described herein could include any number of devices, though preferred embodiment utilize configurations that include as many as ten thermostat devices, four energy monitoring devices, and four load control devices. Any of the thermostat devices can be configured as the master (network coordinator and gateway) for all remaining devices (slaves) in the system. The main function of gateway device 301 is to connect to and communicate with all other devices within its network. The gateway device 301 is also connected to the remote server 309 by means of suitable links such as WiFi, LAN, cellular or other network 308. This communication to the server allows the end user to access all the devices by sending proper communication targeted for each device via this gateway. Also, the stream of data received from each system is stored in the server for access by the end user.

The primary and secondary gateways provide a redundant communication path to the remote server. While operating in standby mode both of these devices maintains a heartbeat communication 311 and 312 with the remote server 309 to confirm it's availability to the server and receive any command from the server. From internal network point of view, these controllers join the master controller's network and function as a slave node and as a thermostat. The main gateway 301 remains the medium for data communication using the main data stream 310 between the network 300 and the remote server 309.

It is important that a graceful conflict resolution algorithm is in place between the Master and Secondary Master, under all operating condition. In a preferred embodiment of the main gateway 301 and primary standby gateway 305, an embodiment of a method for managing network formation is shown. In the method, the following steps can be applied beginning with the user selecting a "Gateway", "Primary Standby Gateway", or "Secondary Standby Gateway" from the available thermostats. The master will then add all slave units and the standby gateways as part of its network. This unit will store the MAC address of all the slave units and standby gateways. The master will share the stored MAC address list and its own MAC address with the standby gateways. Anytime the main or the standby gateways go through a reboot process, this MAC address exchange process should be repeated. This ensures that the standby gateways can duplicate the network of the main gateway, when needed. Main and standby gateways will be connected to the remote server via WiFi, LAN, or cellular network.

On initial power up, the main gateway will always default to work as a master. It will also connect to the remote server. If the connection to the remote server is successful, it will remain as master and attempt to form the internal network. In the event, it fails to connect to the remote server for predefined time, it will switch to a slave mode for a predefined time and try to join a network. At any time, if the remote server communication is restored, it will ask for permission to switch to master mode. If the permission is granted, it will switch to the master mode and start the network formation process. The standby gateway units will default to slave mode and establish a communication with the main server.

Figure 4:
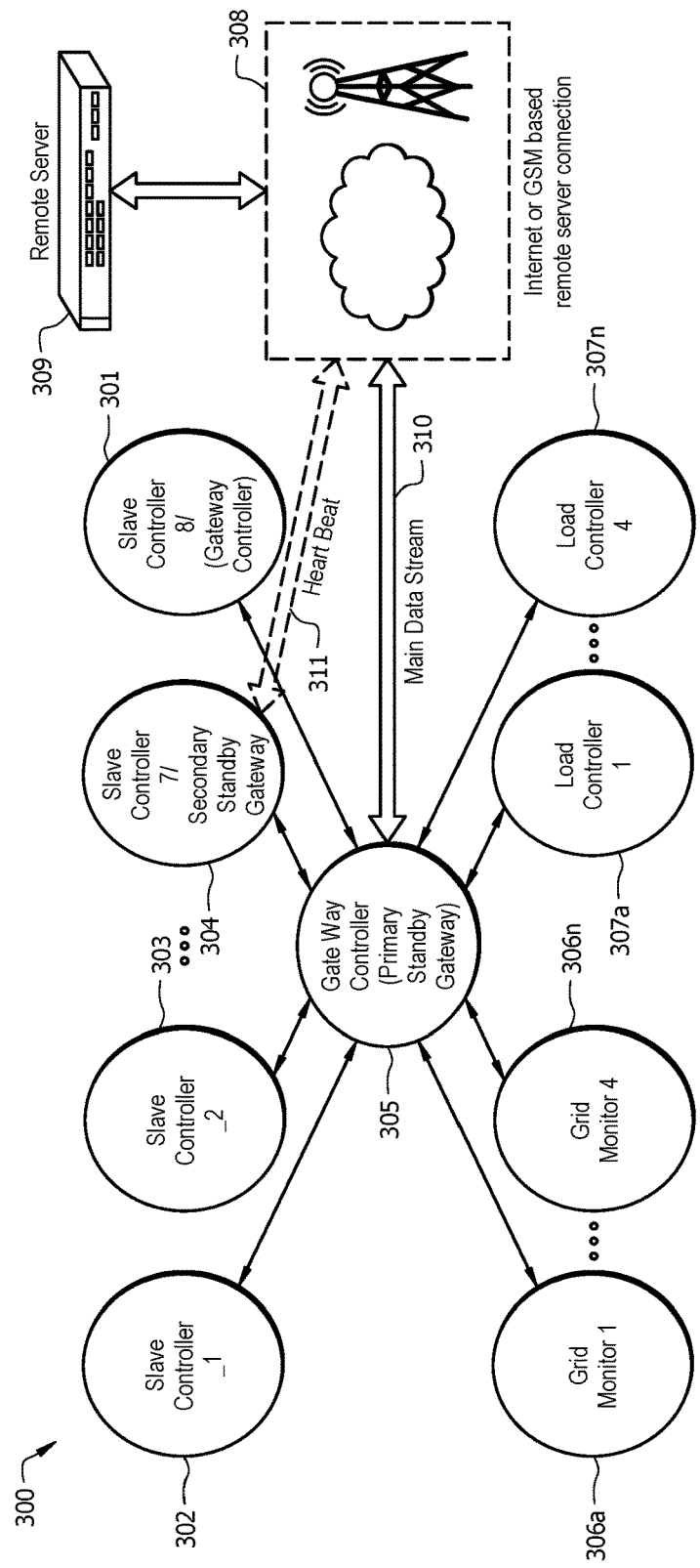
FIGS. 4 and 5 are system diagrams showing an embodiment of a failover to a standby gateway and recovery of the main gateway, respectively.
Figure 5:
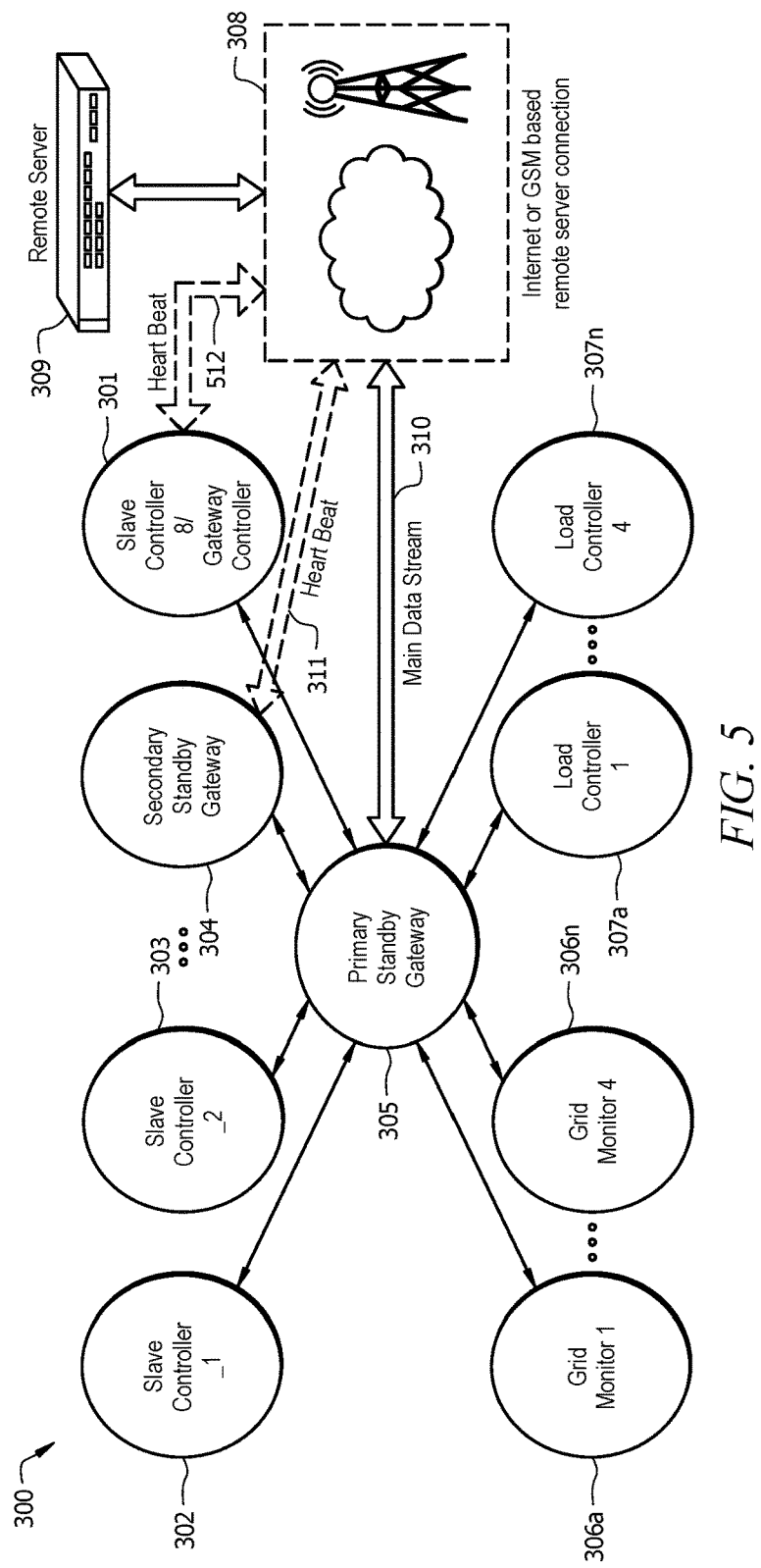

Referring now to FIGS. 4 and 5, system network diagrams showing embodiments of the network in the event of a failure of the main gateway controller (FIG. 4) and a recovery of the main gateway controller (FIG. 5). In the event, the main gateway loses its communication with the remote server or fails to establish a communication on first time power up, this invention allows a graceful transfer of the internal network formation and remote connectivity role to the primary or secondary standby gateway device, in that order and depending on their availability. Embodiments of a method include the remote server 309 detecting a loss of communication from the main master 301 for certain duration, while either or both of the standby gateway heartbeats 311 and 312 are sensed.

Remote server 309 sends a "switch to primary" signal to the primary standby gateway 305, if available. If not, it will send the same signal to the secondary standby gateway 304, if available. The standby gateway 304 or 305 communicates this request to the main gateway 301. This communication is only possible if main gateway 301 is maintaining its communication to the slave unit including the standby gateway 304 or 305. The purpose of this is to make sure that, if the main gateway 301 is still holding the internal network coordination, it will release all slave units from its network and will immediately switch to a slave mode. In the event, the main gateway 301 loses its communication to the slave units (e.g. a total failure of the equipment), all slave units will automatically release them from their present network after certain duration and will be available to join the new network formed by the standby gateway 305.

Now referring to FIG. 5, the standby gateway 305 connects to all slave devices and becomes the new internal network coordinator. The redundant gateway will finally convert to a full gateway and the remote data communication resumes to the server 309 over data path 310. Main gateway 301 if operability is restored will convert to a slave device and send a heartbeat signal 512 to remote server to indicate its health. The main gateway 301 (now connected as a slave to the standby gateway) will continue, after it recovers the remote connectivity to the server 309, to ask for permission to become the main gateway. After receiving this request, the remote server will send a "switch to standby" signal to the standby gateway 305 which is acting as a main gateway. This will initiate a network dissolve process for the standby gateway, which will revert to its slave node. The remote server 309 will also send a "permission to form the network" signal to the main gateway 301, which will restore the network to the original configuration as shown in FIG. 3.

Figure 6:
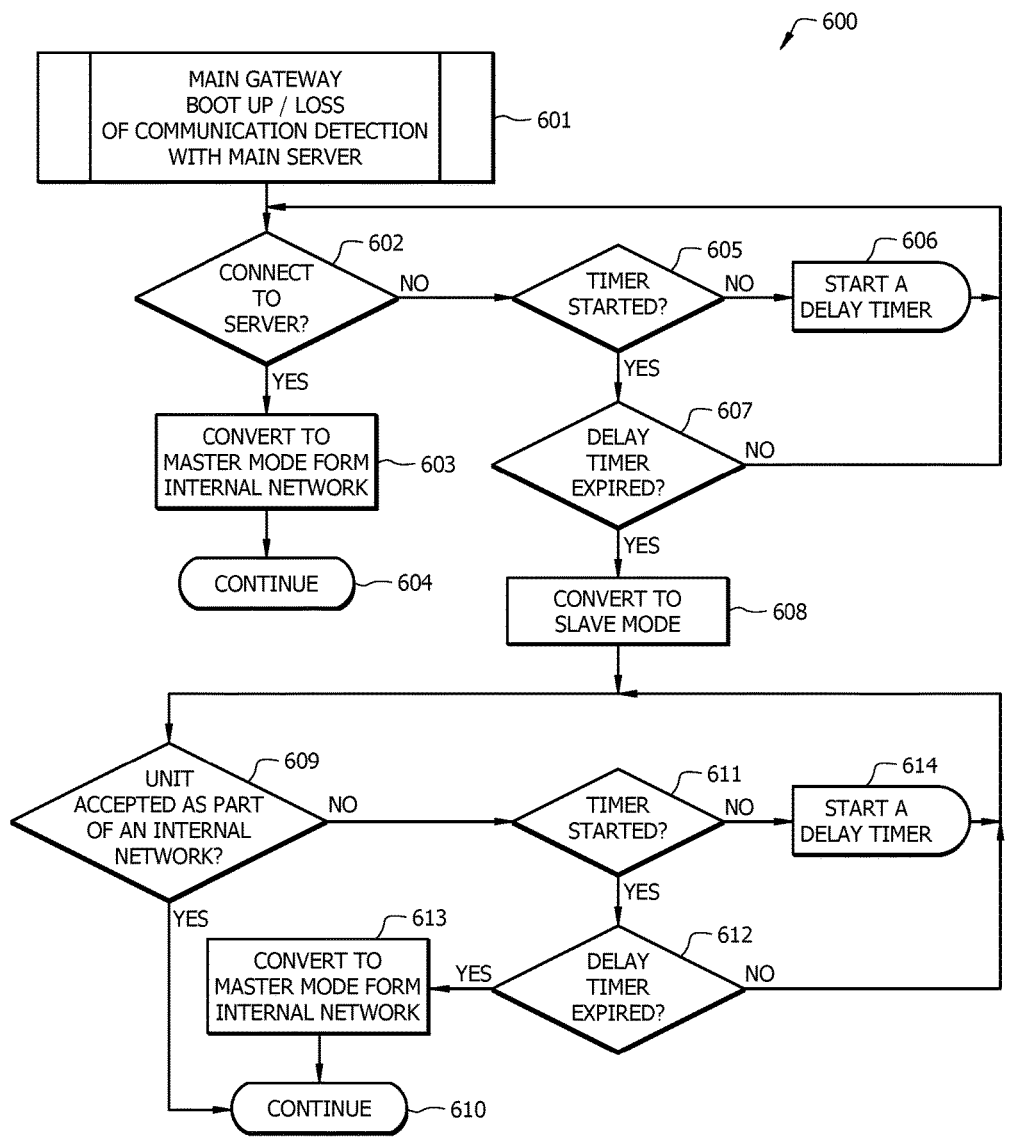
FIG. 6 is a flow chart of a preferred embodiment of a method of network formation for networked thermostats according to the concepts described herein.

Referring now to FIG. 6, an embodiment of a method for main gateway network formation is shown. Process 600 begins with main gateway boot up in block 601. Process 600 can also apply to the behavior of the main gateway in the event of a loss of communication with the remote server. From block 601 the process passes to block 602 where the main gateway determines if it can establish communication with the remote server. If communication is established, the process passes to block 603 where the network with the other devices is formed and the main gateway begins operation as the master. The network then enters operation mode as shown by block 604.

Returning to block 602, if communication with the remote server cannot be established, the process passes to block 605 where a timer is checked to see if it has been started. If the timer has not been started, the timer, which can be set to 10 minutes or another value, is started in block 606 and then the process passes back through block 602 where communication with the remote server is attempted. Referring back to block 605, if the timer has been started, the process passes to block 607, where the timer is checked to see if it has expired. If the timer expires before communication is established, the process passes to block 608 where the main gateway is converted into a slave device. The process then passes to block 609 which determines if the unit has joined an internal network. If so, the process enters its normal mode in block 610. If not, a timer is checked in block 611 and if not yet initialized, it is started by block 614 which loops to block 609 until connection is established or the timer expires in block 612. If the timer expires, the process passes to block 613 where the unit converts to master mode and attempts to form an internal network.

Figure 7:
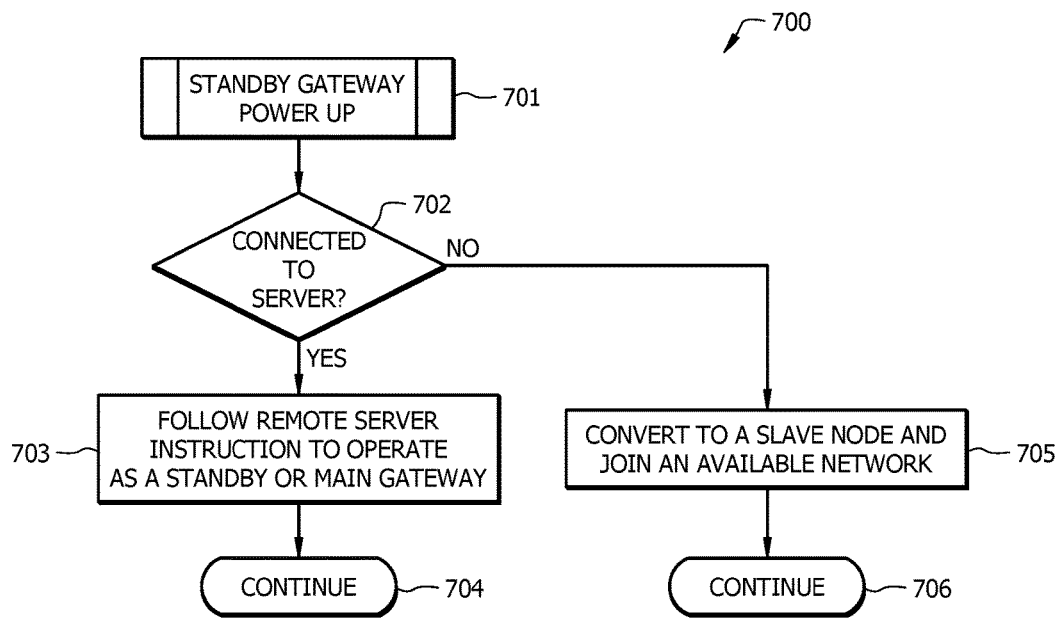
FIG. 7 is a flow chart of a preferred embodiment of a method of initial power up and network formation for a standby gateway according to the concepts described herein.

Referring now to FIG. 7, an embodiment of a method for standby gateway initial power up is shown. Process 700 begins at block 701 where standby gateway is initialized. The process then passes to block 702 where the standby gateway determines if it is connected to the remote server. If it is connected, it receives and follows instructions from the remote server as to whether it operates as a standby or main gateway, as shown in block 703, before it continues normal operation as shown by block 704. If it is not connected to the server, it converts to slave mode and seeks to join an available network, as shown in block 705, before entering normal operation in block 706.

Figure 8:
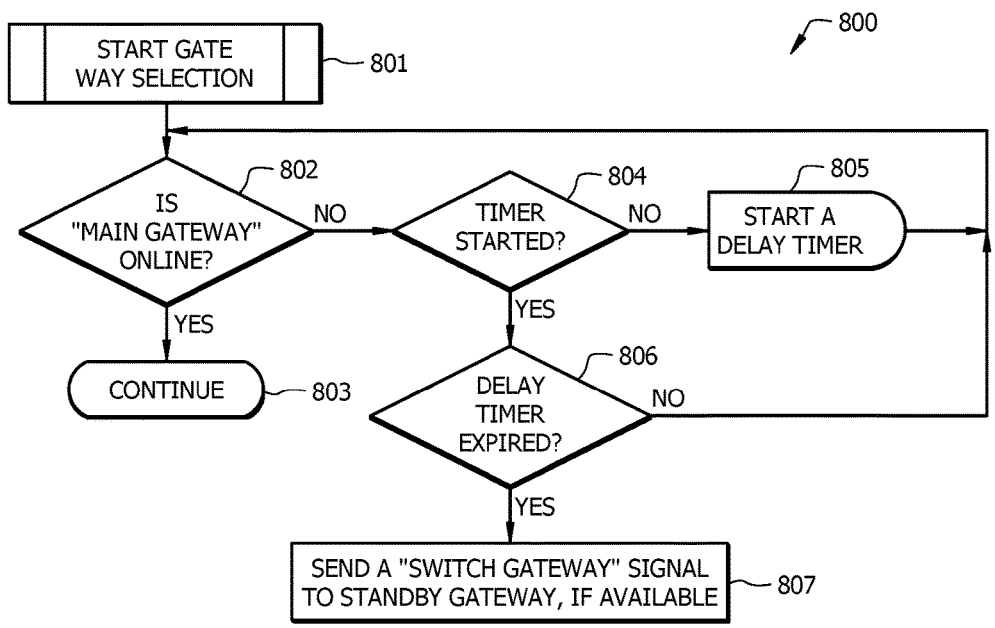
FIG. 8 is a flow chart of a preferred embodiment of a remote server gateway management method according to the concepts described herein.

Referring now to FIG. 8, and embodiment of a method for managing gateways from the remote server is shown. Process 800 begins in block 801 where gateway selection is initiated. Process 800 then proceeds to block 802 where the remote server determines if the designated main gateway is online. If it is, the process passes to block 803 and the network enters normal operation. If it is not, the process passes to block 804 which determines if the timer has been started. If the timer is not started, the process passes to block 805 and then the process returns to block 802. If the timer has started, it is checked to see if it is expired in block 806. If it is not expired the process loops to block 802 and continues to check for the main gateway until communication is established or the timer expires. If the timer expires, the process passes to block 807 where a signal is sent to the standby gateway, if available, ordering the standby gateway to reconfigure into a master gateway.

Figure 9:
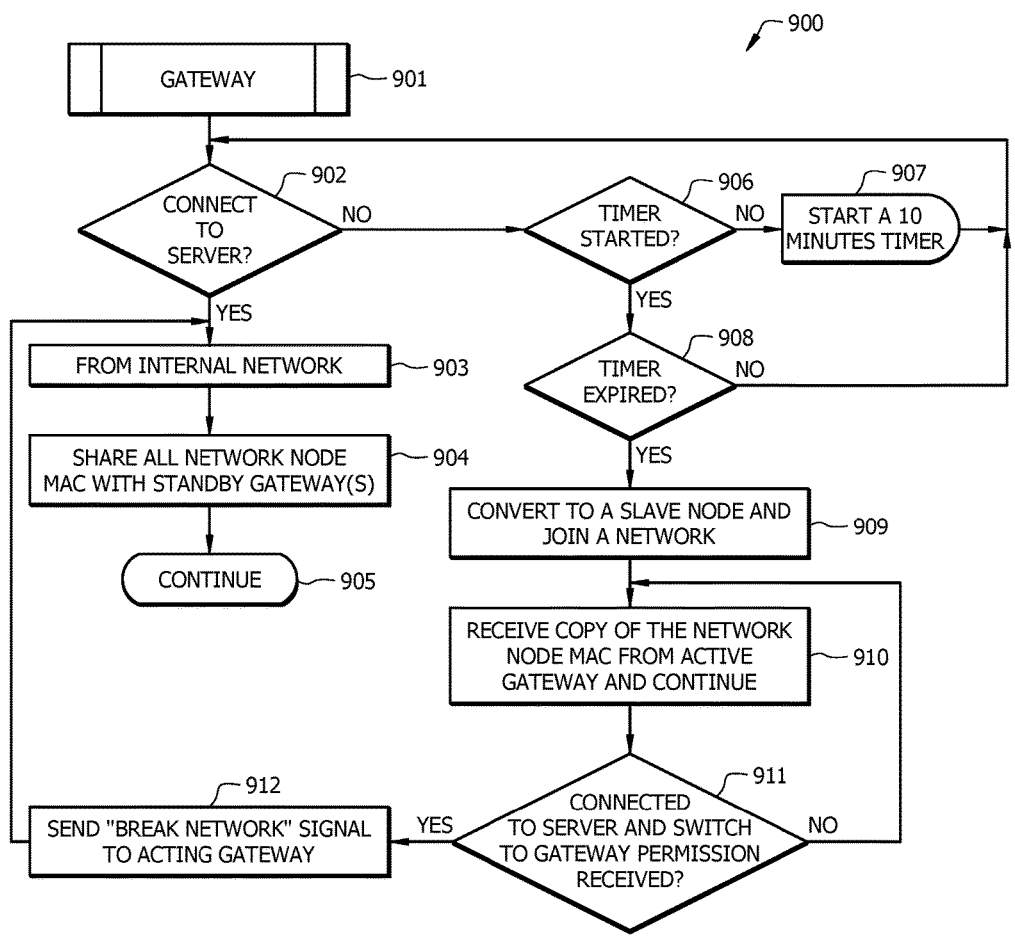
FIG. 9 is a flow chart of a preferred embodiment of a method of initial power up for a primary gateway according to the concepts described herein.

Referring now to FIG. 9, an embodiment of a method for main gateway startup is shown. Process 900 begins with main gateway boot up in block 901. From block 901 the process passes to block 902 where the main gateway determines if it can establish communication with the remote server. If communication is established, the process passes to block 903 where main gateway forms an internal network with other devices in the area and the main gateway begins operation as the master. The main gateway then shares all network node MAC addresses of all the other devices on the network with the standby gateway or gateways, as shown by block 904. The network then enters operation mode as shown by block 905.

Returning to block 902, if communication with the remote server cannot be established, the process passes to block 906 where a timer is checked to see if it has been started. If the timer has not been started, the timer, which can be set to 10 minutes or another value, is started in block 907 and then the process passes back through block 902 where communication with the remote server is attempted. Referring back to block 906, if the timer has been started, the process passes to block 908, where the timer is checked to see if it has expired. If the timer expires before communication is established, the process passes to block 909 where the main gateway is converted into a slave device and joins a network as a standby gateway. The process then passes to block 910 where it receives a copy of the MAC addresses for the other devices on the network from the acting main gateway.

The process then passes to block 911 which determines if the unit has been able to establish a connection to the remote server. If it has been able to contact the server, the process passes to block 912 where a "break network" signal is sent to the acting main gateway and the process moves to block 902 where the gateway forms the internal network. If the gateway has been unable to connect to the server, as determined in block 911, the process returns to block 910 and continues to check with the remote server in block 911 until communication is reestablished.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of operating a group of networking thermostats connected to a remote server, the method comprising:
    designating one networking thermostat from the group of networking thermostats as a master operable to communicate with the remote server,
    designating another of the networking thermostats as a standby master, the standby master and the remainder of the networking thermostats operating as slaves, wherein the standby master maintains a connection to the remote server such that the networking thermostat confirms its availability to the remote server and receives commands from the remote server;
    forming a network where the remainder of networking thermostats operating as slaves form a star network with the networking thermostat designated as the master communicating with the remote server;
    collecting data from the slaves at the master;
    passing the data to the remote server;
    defaulting to the standby master if communication is lost between the master and the remote server; and
    forming a network where the remainder of networking thermostats operating as slaves form a star network with the networking thermostat designated as the standby master communicating with the remote server.

2. The method of claim 1 wherein each of the networking thermostats can operate as either a slave or a master.

3. The method of claim 1 wherein a secondary standby master is also designated.

4. The method of claim 1 further comprising having the networking thermostat originally designated as mater revert back to master mode when communication with the remote server is reestablished.

5. The method of claim 1 further comprising a network management function storing the addresses of all slaves when the networking thermostat is in master mode.

6. The method of claim 1 wherein the communications processor includes a slave message data storage to store messages to allow a quick response time in response to incoming communications from the master.

7. A method of operating a networking thermostat connected to a remote server, the method comprising:
    designating the networking thermostat as a standby master, the networking thermostat acting as a slave to a master thermostat, wherein the networking thermostat acting as a standby master maintains a connection to the remote server such that the networking thermostat confirms its availability to the remote server and receives commands from the remote server;
    receiving a command from the remote server to become master thermostat when the remote server detects a problem with the original master thermostat; and
    forming a network with other networking thermostats operating as slaves to form a star network with the networking thermostat acting as a new master thermostat.

8. The method of claim 7 wherein any of the networking thermostats can operate as either a slave or a master.

9. The method of claim 7 wherein a secondary standby master is also designated.

10. The method of claim 7 further comprising having the networking thermostat originally designated as mater revert back to master mode when communication with the remote server is reestablished.

11. The method of claim 7 further comprising a network management function storing the addresses of all slaves when the networking thermostat is in master mode.

12. The method of claim 7 wherein the communications processor includes a slave message data storage to store messages to allow a quick response time in response to incoming communications from the master.

13. The method of claim 7 further comprising, when the networking thermostat is acting as the master:
   collecting data from the slaves at the master;
   passing the data to the remote server;
   defaulting to the standby master if communication is lost between the master and the remote server.

\* \* \* \* \*